United States Patent [19]

Lagoutte et al.

[11] 3,966,177

[45] June 29, 1976

[54] FEED DEVICE FOR PLASTICS PROCESSING MACHINES

[75] Inventors: Serge Lagoutte, Chalon-sur-Saone; Andre Lanciaux, Chatenoy-le-Royal, both of France

[73] Assignee: Societe d'Etudes Verrieres, Neuilly-sur-Seine, France

[22] Filed: Sept. 27, 1973

[21] Appl. No.: 401,443

Related U.S. Application Data

[63] Continuation of Ser. No. 47,187, June 18, 1970, abandoned.

[30] Foreign Application Priority Data

June 19, 1969 France .............................. 69.20528

[52] U.S. Cl. ................................ 259/185; 259/22; 425/207
[51] Int. Cl.² ........................................... B29B 1/04
[58] Field of Search .............. 425/207, 381, 381.2, 425/202; 259/185, 7, 8, 23, 24, 191, 192, 21, 22, 194

[56] References Cited

UNITED STATES PATENTS

| | | | |
|---|---|---|---|
| 3,153,686 | 10/1964 | Adams | 425/207 |
| 3,262,154 | 7/1966 | Valyi | 425/207 |
| 3,277,528 | 10/1966 | Nikiforov | 425/207 |
| 3,602,943 | 9/1971 | Neuville | 425/381.2 |
| 3,605,186 | 9/1971 | Wagner | 425/202 |

*Primary Examiner*—Robert W. Jenkins

[57] ABSTRACT

This invention is addressed to a new and improved feeding device for feeding plastic materials, such as thermoplastic materials, to a processing machine including a fixed plate and a rotatable plate having an annular channel therebetween and a feed hopper to supply plastic material to the annular channel in which the feeding device comprises a metering screw to feed plastic material from the feed hopper to the annular channel and a hook-crown including a plurality of deflecting hooks mounted on the rotatable plate in the annular channel whereby the deflecting hooks sweep the volume of the annular channel and deflect the plastic material fed thereto by the metering screw to permit regular and efficient feeding to the processing device.

1 Claim, 7 Drawing Figures

INVENTOR.

BY

FEED DEVICE FOR PLASTICS PROCESSING MACHINES

This is a continuation, of application Ser. No. 47,187, filed June 18, 1970, now abandoned.

This invention relates to a feed device for plastics processing machines such as extruders or mixers, and more particularly to a device permitting a regular and efficient feed of these machines with powdered thermoplastic materials.

It is known that it is often difficult to introduce powdered thermoplastic materials having a relative low softening point into an interior space where they are to be processed. In consequence of the frictions which they undergo, these materials gel in some spots and form agglomerates which may at least partially clog the feed orifices or settle out at the periphery of the mechanical parts of the devices. This is particularly aggravated when the material has undergone a significant pressure loss at its emerging from the apparatus, as is the case in the manufacture of fibers by extrusion.

It has been proposed to set one or several rotating screws into the feed hopper or between the latter and the external part of the machine: nevertheless it cannot be avoided that the material, before being homogeneously sheared and gelled, has a tendency to accumulate at the inlet of the machine, and partially agglomerate to thereby prevent a regular output of the apparatus to the detriment of the qualities of the products obtained by means of this machine.

It is an object of the present invention to obviate these disadvantages and it is a more specific object of the invention to provide a device which leads the material towards the active part of the machine by avoiding the return of the material towards the zone communicating with the feed hopper.

These and other objects and advantages of the invention will appear hereinafter, and for purposes of illustration, but not of limitation, embodiments of the invention are shown in the accompanying drawings in which.

The feed device of this invention, in addition to a metering screw located in the feed hopper, comprises a crown of deflecting hooks located around the rotating place of the machine in an annular channel through which the plastic carried along by the metering screw flows.

The front edge of the hooks scrapes the material on the bottom of the annular channel whereas the back part of the hooks as a result of the deflection action due to their shape, leads the material towards the axial part of the machine through a groove provided between the hooks for this purpose.

The general profile of the hooks is such that they pass, while rotating with the rotating plate, through the entire volume of the annular channel, thus ensuring a complete sweeping of the material therein and clearing continuously the outlet of the hopper in the annular channel, near the lower end of the metering screw. In their rotary motion, the hooks exert a complementary centripetal force on the material which results in a substantial increase of the pressure, particularly in the case where the machine is an extruder.

In order to avoid a back-flow of the material towards the feed zone, the hooks are advantageously extended backwards by a thickened part, the slender end of which lies on the crown, backwards with regard to the front end of the following hook.

Preferably, the metering screw is located in a cylindrical sleeve connected to the base of the feed hopper and having a lower diameter fairly equal to that of the external diameter of the screw threads of the metering screw.

In order to permit a rigorous checking of the feed by means of the device of this invention, it is beneficial that the rotary motion of the metering screw is driven by an adjustable driving system independent from that which actuates the hook-crown.

Figure 1:
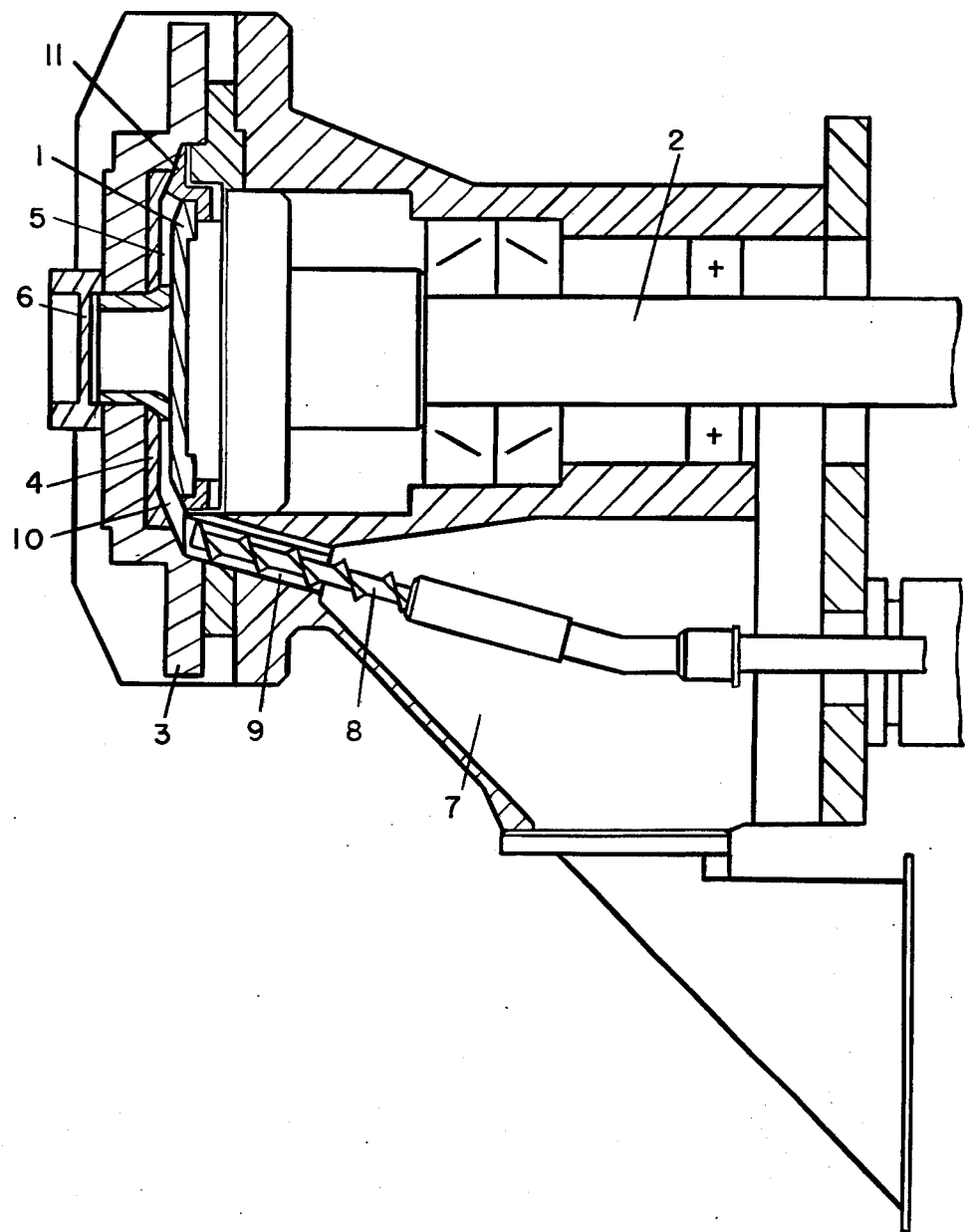
FIG. 1 represents a sectional schematical view of an extruder with rotating plate embodying the concepts of this invention.

Referring now to the drawings, the main working piece of the extruder represented in FIG. 1 is the rotating plate 1 rotated by its axis 2 in a cavity formed in the frame 3 of the extruder. The rotating plate 1 is separated from a fixed parallel plate 4 by a gap 5 in which the material is intensively sheared before being extruded through the die 6. The feed of material to be extruded is achieved from the hopper 7 in which rotates a screw 8, some screw threads of which are in the bellshaped part of the hopper and others of which are in the collar 9 of this latter. This collar emerges into an annular channel 10 limited by the fixed plate bevelled at the periphery of the gap and the rotor also bevelled on its rim. A hook 11 is represented schematically in section.

Figure 2:
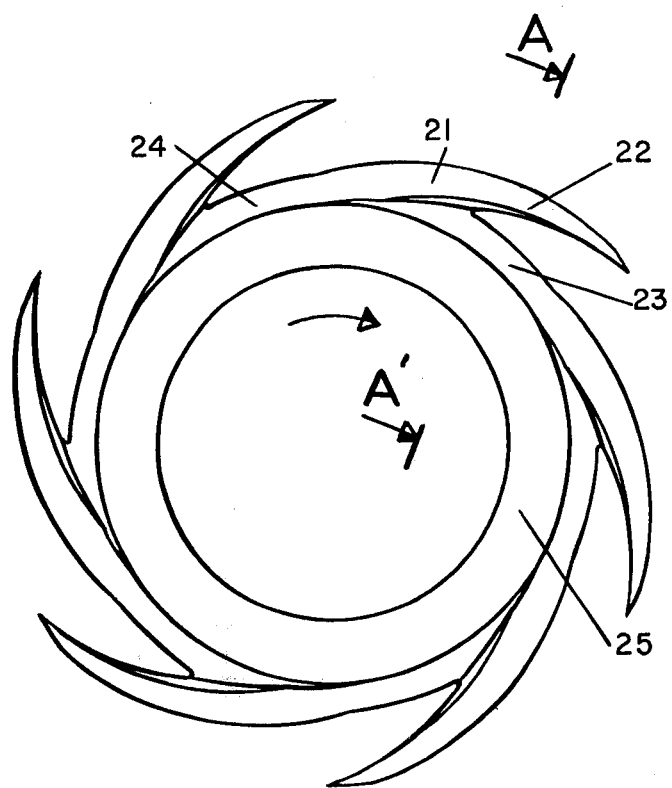
FIG. 2 represents an underneath view of a hook-crown.
Figure 3:
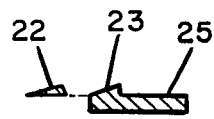
FIG. 3 represents a section of the hook-crown of 2 along AA'.

A hook-crown having a desirable shape is represented in FIGS. 2 and 3. It comprises six hooks having a general triangular section in which the hooks have the shape of open hooks, bent such that their convexity is orientated toward the center of the crown and oriented in the direction or rotation of this latter. Each hook is composed of a main portion 21 integral with the crown and of a slender portion 22. Between the successive hooks represented in FIG. 3 by the sections 22 and 23 there is a depressed zone or recess 24 permitting the passage of the material towards the axis of the apparatus. Finally the hook-crown is integral with the flat ring 25 to permit anchoring of the crown on the rotating plate of the extruder.

Figure 4:
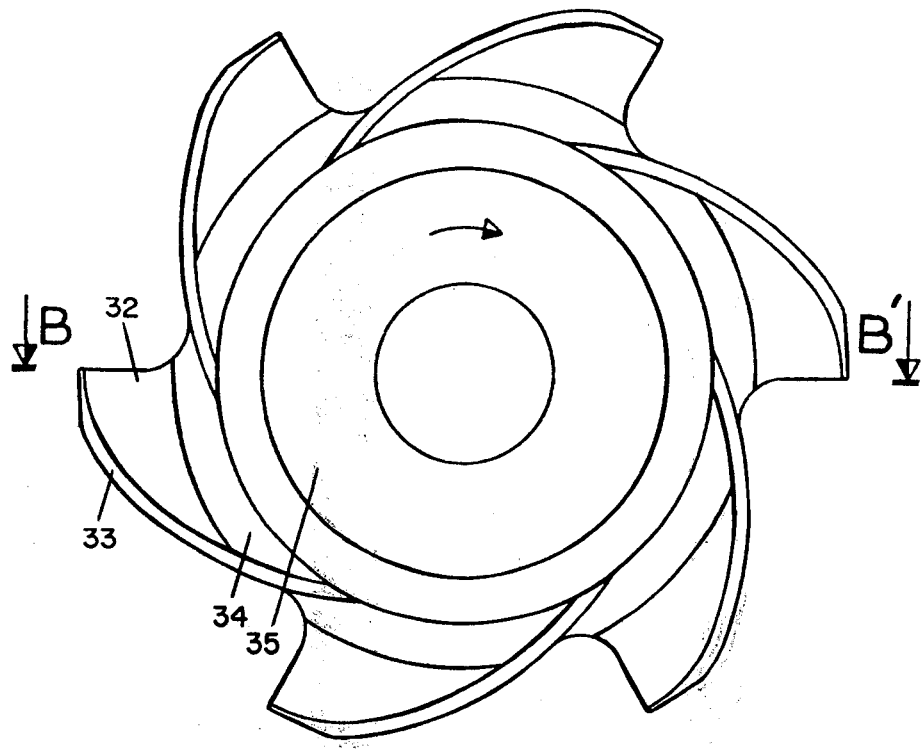
FIG. 4 represents an underneath view of a hook-crown having a preferential shape of six hooks.
Figure 5:
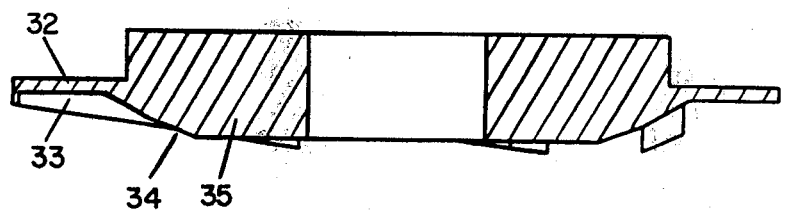
FIG. 5 represents a section of the hook-crown of FIG. 4 along BB'.

In FIG. 4, the spoon-shaped hooks have in projection the general shape of the teeth of a circular saw and include a sharp front edge 32 intended to scrape the surface of the feed annular channel in which they rotate, and a back curved rim 33 having a height substantially equal that of the feed annular channel. The rim 33 serves to deflect the material which is thus brought towards the axis of the apparatus through the recess 34 provided before each of the rims. The ring serving to the anchoring of this crown of hooks and spoons is shown as 35. The same references are sued for the same elements in FIG. 5.

Figure 6:
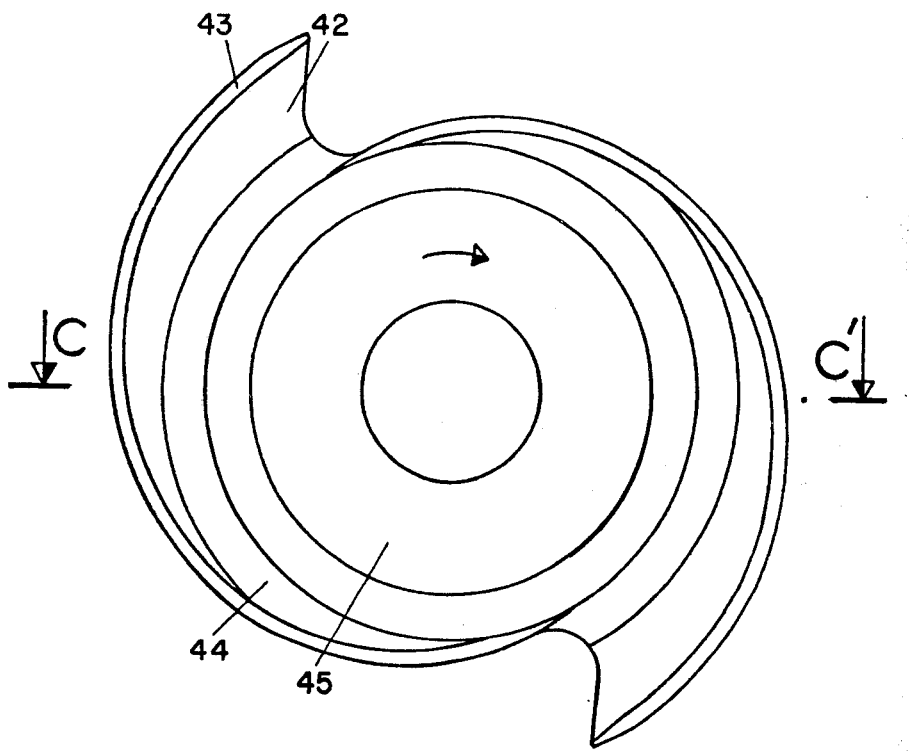
FIG. 6 represents an underneath view of a hook-crown having a preferential shape of two hooks.

In FIG. 6, the crown comprises only two hooks in the shape of elongated spoons, symmetrically located relative to the axis of the crown. Each of the hooks comprises a front edge 42 and a curved rim 43 which serves to exert progressively on the material a deflecting crown and has for the effect of bringing the material towards the axis of the apparatus through the groove 44, open toward the machine gap. The ring is visible as 45. The same references are sued for the same elements in FIG. 7.

In FIGS. 2, 4 and 6, the arrows indicate the direction of the crowns.

Having described the basic concepts of the invention, reference is now made to the following specific examples of the use of the present invention with an extruder having a rotating plate of the vertical axis type, such as is described in copending application Ser. No. 837,117, filed June 27, 1969.

EXAMPLE 1

The extruder is equipped with a device comprising a metering screw located at the base of the feed hopper and a crown with six teeth in the shape of open hooks, such as represented in FIG. 2, mounted on the rotating plate of the extruder and rotating in the feed annular channel round the machine gap.

The extruder is equipped with a die having a diameter equal to 50 mm bored with 234 holes with 1 mm in diameter each and mounted under the fixed plate.

The metering screw comprises a screw thread having an external diameter equal to 21 mm and a pitch equal to 28 mm. It is engaged to the three fifths in the sleeve connecting the hopper with the annular channel and it is driven through the powdered charge by means of a motor-reducer system with independent control actuating shafts connected by a cardan joint.

The hook-crown has an overall diameter of 230 mm, each hook having an increasing thickness from 2–13 mm and a length of 50 mm in its recessed part.

The dimensions of the annular channel in which the hooks succeed each other, are adjusted in such a manner that between the hooks and walls of the channel there remains only the required clearance in order to allow the passage of the hooks without friction.

The hook-crown is fixed to the rotating plate of the extruder and is driven at the same speed as this latter.

The feeding is carried out with powdered resin of polyvinyl chloride by operating at a rotation speed of the rotating plate of 60 rpm and at a rotation speed of the metering screw of 50 rpm. The temperature of the material at the die is between 225° and 236°C and there is obtained an output in fibers of polyvinyl chloride ranging from 25 to 30 kg/hour, which can be maintained for 15 hours continuously and without visible decomposition of the polyvinyl chloride. By varying the respective rotation speeds of the rotating plate and of the metering screw, it has been possible to obtain outputs in the range of 45 kg/hour and to produce high grade fibers.

EXAMPLE 2

Figure 7:
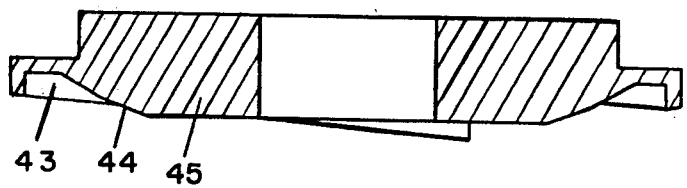
FIG. 7 represents a section of a hook-crown of FIG. 6 along CC'.

In this example, there is fed a powdered resin of polyvinyl chloride, to an extruder with rotating plate of the type described in Example 1 and equipped with a feed device in accordance with this invention comprising a metering screw located at the base of the feed hopper and a crown bearing two hooks in the shape of elongated spoons, such as represented in FIGS. 6 and 7, to manufacture a full rod. For this purpose, the extruder is equipped with a die having a diameter of 8 mm.

The outputs of extruded material are measured for various rotation speeds of the rotating plate of the machine and of the metering screw, the gap between plates being in all cases, equal to 5 mm and the temperature of the material at the outlet of the die being between 200° and 205°C. The results are set forth in the following table:

| Rotation speed(rpm) | | Output (Ag/h) |
|---|---|---|
| Rotor | Metering Screw | |
| 70 | 116 | 38 |
| 100 | 174 | 58 |
| 165 | 265 | 90 |
| 195 | 314 | 110 |

The outputs are regular. The extruded rod is well melted and has a perfectly smooth surface.

Of course, these application examples of the device of this invention are given only by way of illustration and in no way do they limit the scope of this invention, particularly with regard to the number and the shape of the deflecting hooks of the crown driven by the rotor of the machine, the ratio of the driving speeds of the rotor and of the metering screw or the kind and the shape of the plastics with which the machine is supplied.

Although the examples concern only extruders, the device of this invention can also be used in the feeding of rotary machines in which the plastic or the plastics are not subjected to any thermal action for the purpose of gelling, but only to a mechanical action in order to achieve, for instance, milling, mixing or even separation of the products supplied into the machine, which can be cooled as much as necessary by known means.

It will be understand that various changes and modifications may be made in the details of formulation, procedure and use without departing from the spirit of the invention, especially as defined in the following claims.

We claim:

1. In a device for processing plastic materials including a fixed plate and a rotatable plate defining a gap therebetween, the improvement comprising an annular channel extending radially outside both the fixed plate and the rotatable plate about the gap and communicating with the gap, a metering screw to feed plastic material to the channel and a crown hook including a plurality of deflecting hooks extending radially outwardly from the rotatable plate to sweep the annular channel through each rotation and deflect plastic material fed to the channel to permit regular and efficient feeding of the device.

* * * * *